United States Patent [19]
Minakuchi et al.

[11] Patent Number: 5,844,547
[45] Date of Patent: Dec. 1, 1998

[54] APPARATUS FOR MANIPULATING AN OBJECT DISPLAYED ON A DISPLAY DEVICE BY USING A TOUCH SCREEN

[75] Inventors: Yu Minakuchi; Satoshi Okuyama, both of Kawasaki; Akiko Fukue, Tokyo; Hajime Kamata, Kawasaki, all of Japan

[73] Assignee: Fujitsu Limited, Kawasaki, Japan

[21] Appl. No.: 437,563

[22] Filed: May 9, 1995

Related U.S. Application Data

[63] Continuation of Ser. No. 953,101, Sep. 29, 1992, abandoned.

[30] Foreign Application Priority Data

Oct. 7, 1991 [JP] Japan .................................. 3-258232

[51] Int. Cl.$^6$ ...................................................... G09G 5/00
[52] U.S. Cl. ............................................ 345/173; 345/156
[58] Field of Search .................................... 345/173, 174, 345/175, 176, 179, 180, 182, 123, 126, 156, 157, 145, 146, 358; 178/18, 19

[56] References Cited

U.S. PATENT DOCUMENTS

| | | | |
|---|---|---|---|
| 3,673,327 | 6/1972 | Johnson et al. | 178/18 |
| 4,887,230 | 12/1989 | Noguchi et al. | 364/560 |
| 4,914,624 | 4/1990 | Dunthorn | 364/900 |
| 5,174,759 | 12/1992 | Preston et al. | 434/317 |
| 5,347,628 | 9/1994 | Brewer et al. | 395/159 |

FOREIGN PATENT DOCUMENTS

| | | |
|---|---|---|
| 1-314321 | 12/1989 | Japan . |
| 3-222033 | 10/1991 | Japan . |
| 8505201 | 11/1985 | WIPO .............................. G06F 3/023 |

OTHER PUBLICATIONS

Noriyuki Shimizu, "Touch Panel Input Device," JP-A-134321 dated Dec. 19, 1989, Abstract.

IBM Technical Disclosure Bulletin, vol. 32, No. 10A, Mar. 1990, "Revolving Selection Field," pp. 179–181 (XP 83216).

IBM Technical Disclosure Bulletin, vol. 33, No. 1B, Jun. 1990, "Pressure–Sensitive Icons," pp. 277–278 (XP 122887).

Carr, Robert M., "The Point of the Pen," BYTE, vol. 16, No. 2, Feb. 1991, pp. 211–221 (XP 263301).

Freeman D. "Patricial Seybolds's Office Computing Report" Aug. 89 v12 n8 p. 18(2).

Newman, William M, "Principles of Interactive Computer Graphics", 1979, S.L.No. T 385 N4 1979C.2 ISBN 0-07-046338-7.

Primary Examiner—Xiao Wu
Attorney, Agent, or Firm—Staas & Halsey

[57] ABSTRACT

Apparatus and a method of operation manipulates the display of an object on the display surface of a display device in accordance with sensing touching contact on a touch panel, superimposed on the display surface and simulating movement of the displayed object in accordance with the characteristics of the touching contact on the touch panel adjacent to the displayed object image. Further, object data defining the display of the object image for each of a plurality of different states of the object, display information specifying the shape and physical properties of the object and the current display position thereof and file information relating to the stored data are stored and accessed for interpreting the simulated manipulation of the object by the characteristics of the touching contact therewith, for correspondingly manipulating and displaying the thus manipulated object image.

42 Claims, 11 Drawing Sheets

FIG. 4(a)

| OBJECT TYPE | DISPLAY POSITION INFORMATION | | | | FILE INFORMATION | | | | NORMAL DISPLAY FILE NAME | SPECIAL STATE FILE NAME |
|---|---|---|---|---|---|---|---|---|---|---|
| | TOP-LEFT COORD | | SIZE | | ANGLE | TOTAL SIZE | | DISPLAY POSITION | | |
| | X | Y | W | H | | W | H | X | Y | | |
| | | | | | | | | | | | |

| X-COORD (4 BYTES) | X-COORD (4 BYTES) | PRESSURE (4 BYTES) |
|---|---|---|

2I

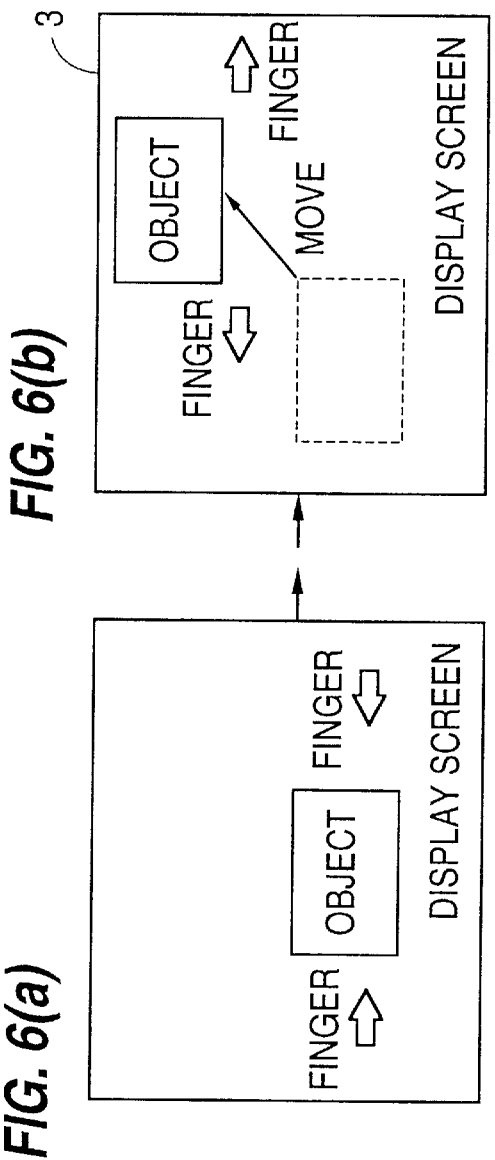

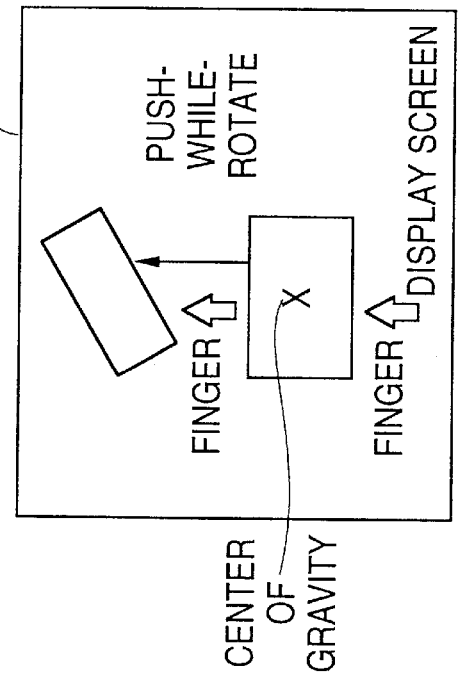
FIG. 8(a)
FIG. 8(b)
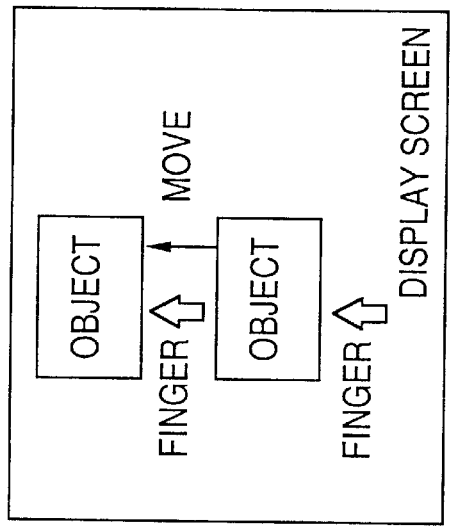
FIG. 8(c)

FIG. 9(a)
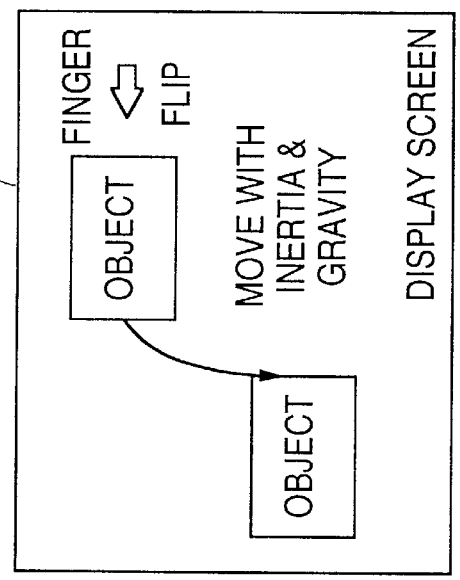
FIG. 9(b)
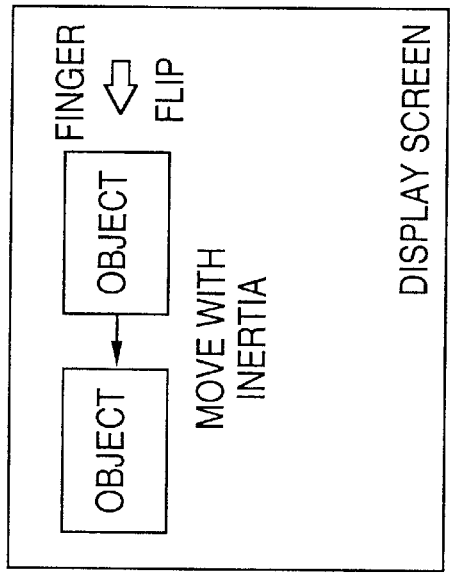
FIG. 9(c)
| OBJECT TYPE | DISPLAY POSITION INFORMATION | | | | | | FILE INFORMATION | | | | |
|---|---|---|---|---|---|---|---|---|---|---|---|
| | TOP-LEFT COORD | | SIZE | | ANGLE | TOTAL SIZE | | DISPLAY POSITION | | NORMAL DISPLAY FILE NAME | SPECIAL STATE FILE NAME |
| | X | Y | W | H | | W | H | X | Y | | |
| NORMAL | 500 | 100 | 200 | 400 | 0 | — | — | — | — | OBJ3 | — |
1T

APPARATUS FOR MANIPULATING AN OBJECT DISPLAYED ON A DISPLAY DEVICE BY USING A TOUCH SCREEN This application is a continuation, of application number 07/953,101, filed Sep. 29,1992, now abandoned.

BACKGROUND OF THE INVENTION

1. Field of the Invention

The present invention relates to an apparatus for manipulating an object displayed on a display device by using a touch screen.

As use of computer systems for data processing has become widespread in recent years, more and more users are being required to handle same, i.e., to input data and converse with data processors such as work stations and personal computers. A vast variety of application programs are available for recent data processors and even a complicated application can be processed by using such application programs in combination. However, it is a great problem that such data processors are very difficult to handle, especially to manipulate an object displayed on a display device, for those who have less than a substantial knowledge of computers.

Therefore, an apparatus for manipulating an object displayed on a display device, which is easily handled even for a person who has no special knowledge of computers, is in great demand.

2. Description of the Related Art

FIG. 1 illustrates a computer system with a conventional user interface.

A computer system with a conventional user interface consists mainly of a central processing unit (CPU) 4, a main memory 5, a keyboard/mouse 2, a frame memory 6 and a hard disk interface 71, which are interconnected via a system bus, and also a hard disk 7 and a display unit 3, which are connected to system bus via the hard disk interface and the frame memory 6, respectively. The main memory 5 stores a system control program and application programs which handle graphics processing, and provides a work area for use by the programs. The CPU 4 performs display operations under control of the programs. The hard disk 7 stores a data file for graphics to be displayed on the display unit 3. The frame memory 6 stores a frame of picture (or object) data to be displayed on the display unit 3.

To manipulate an object displayed on a display unit 3 in the above system, an operator is required to input a command, for manipulating the object by using a keyboard/mouse 2, or to select an icon (a symbolic representation of a computer function), displayed on a display unit 3 by using the keyboard/mouse 2, in order to command a desired function. However, it is troublesome and annoying to use a keyboard/mouse and icons and a person with less than a substantial knowledge of computers tends to be reluctant even to touch a keyboard/mouse.

Therefore, it is a great problem that such data processors are very difficult to handle for those who have less than a substantial knowledge of computers.

SUMMARY OF THE INVENTION

It is an object of the present invention to provide an apparatus which can easily manipulate an object displayed on a display unit.

It is another object of the present invention to provide a user interface with which a user can easily manipulate an object displayed on a display unit.

To achieve the above and other objects, the present invention provides a touch screen, a plurality of data files, display information storage means and display control means.

In the apparatus for manipulating an object displayed on a display device, the touch screen, which is a transparent panel and is mounted on the display surface, or screen, of a display device and is sensitive to the touch, e.g., of a finger of a human operator, outputs touch screen information representing the motion of the body. The plurality of data files store object data for displaying the object in different states. The display information storage means stores object information including at least an object type which specifies the shape and physical properties of the object, display position information which specifies a position where the object is displayed on the display device, file information which specifies the size and location of a part of the object data stored in one of said plurality of data files, and a file name which specifies one of said plurality of data files. The display control means recognizes a manipulation to be conducted on the object, based on the touch screen information from the touch screen and on the object information included in the display information storage means, and displays the object on the display device in accordance with the aforesaid recognition.

BRIEF DESCRIPTION OF THE DRAWINGS

FIG. 4(a) is a display information table;

FIG. 4(b) illustrates the format of touch-screen information;

FIGS. 6(a) and 6(b) are related and interconnected diagrams illustrating and FIG. 6(c) is a table explaining a pick manipulation;

FIGS. 8(a) and 8(b) are related diagrams illustrating and FIG. 8(c) is a table explaining a push manipulation;

FIGS. 9(a) and 9(b) are related diagrams illustrating and FIG. 9(c) is a table explaining a flip manipulation;

Throughout the above-mentioned drawings, identical reference numerals are used to designate the same or similar component parts.

DESCRIPTION OF THE PREFERRED EMBODIMENTS

Figure 2:
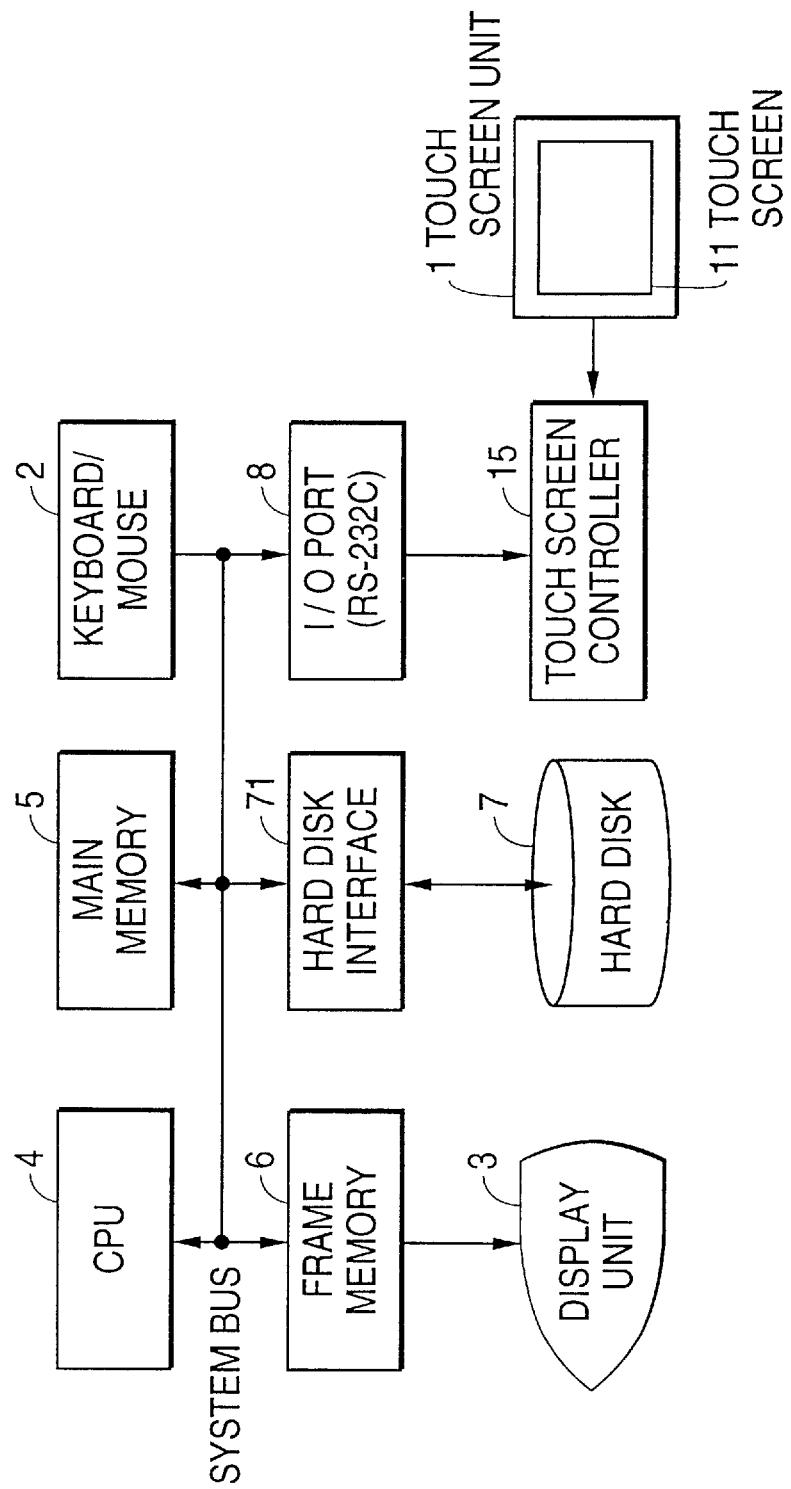
FIG. 2 is a block diagram of the configuration of a touch screen-equipped workstation, in which the present invention is implemented.

FIG. 2 is a block diagram of the configuration of a touch screen-equipped workstation, in which the present invention is implemented.

Figure 1:
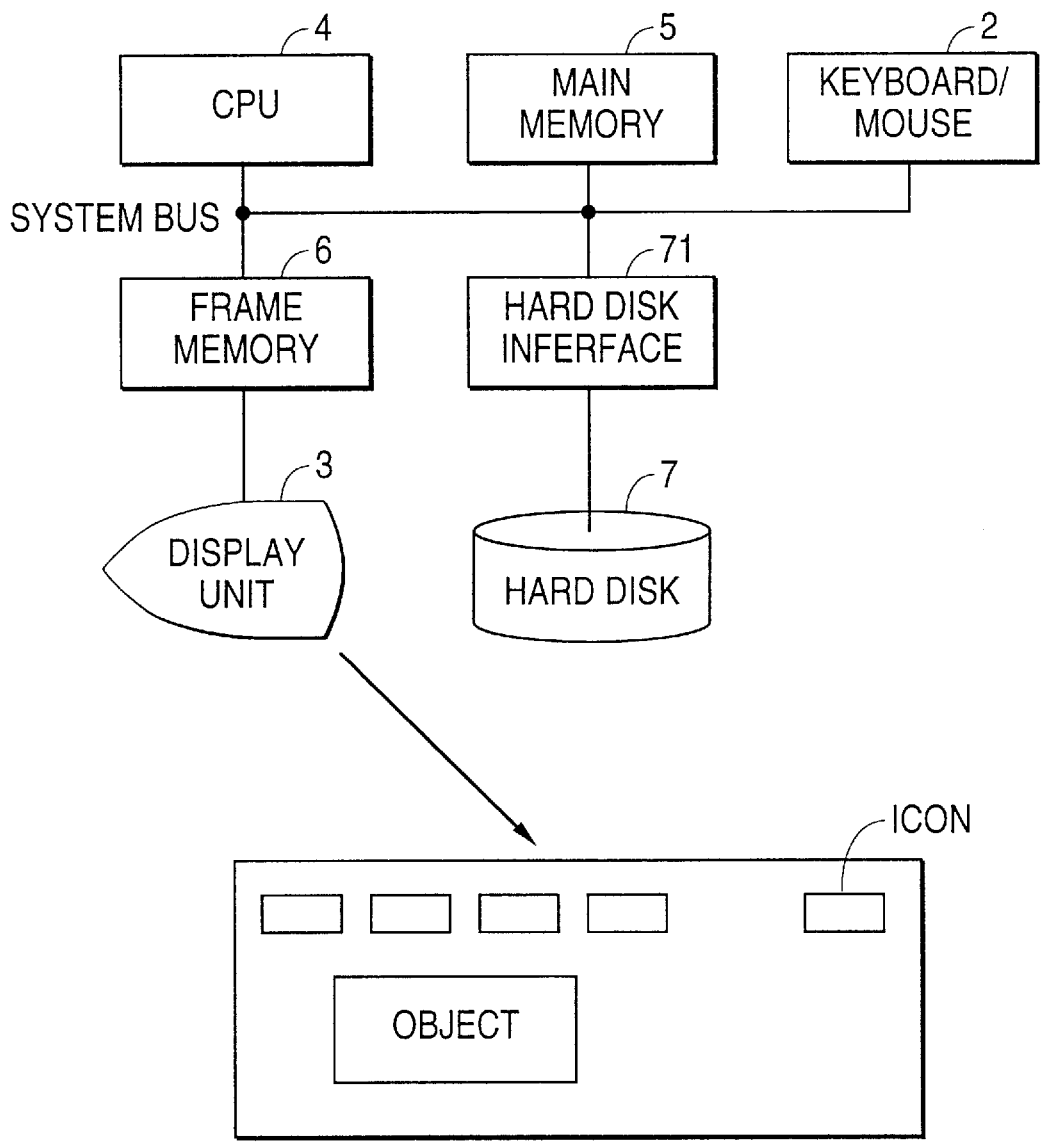
FIG. 1 illustrates a computer system with a conventional user interface.

In addition to the conventional system shown in FIG. 1, the system of FIG. 2, for implementing the present invention, comprises an input-output (abbreviated to I/O) port 8, a touch screen controller 15 and a touch screen unit 1 with a touch screen 11. The touch screen controller 15, connected to the input-output port 8 through an RS-232C interface, controls the touch screen unit 1. The touch screen unit 1, which is sensitive, at a position (defined by X-Y coordinates) at which the touch screen 11 is touched and particularly to the pressure applied thereon when so touched, acts as a user interface that allows a user to send signals to a computer by touching that area thereon with an element, such as the finger, . . . etc.

Figure 3:
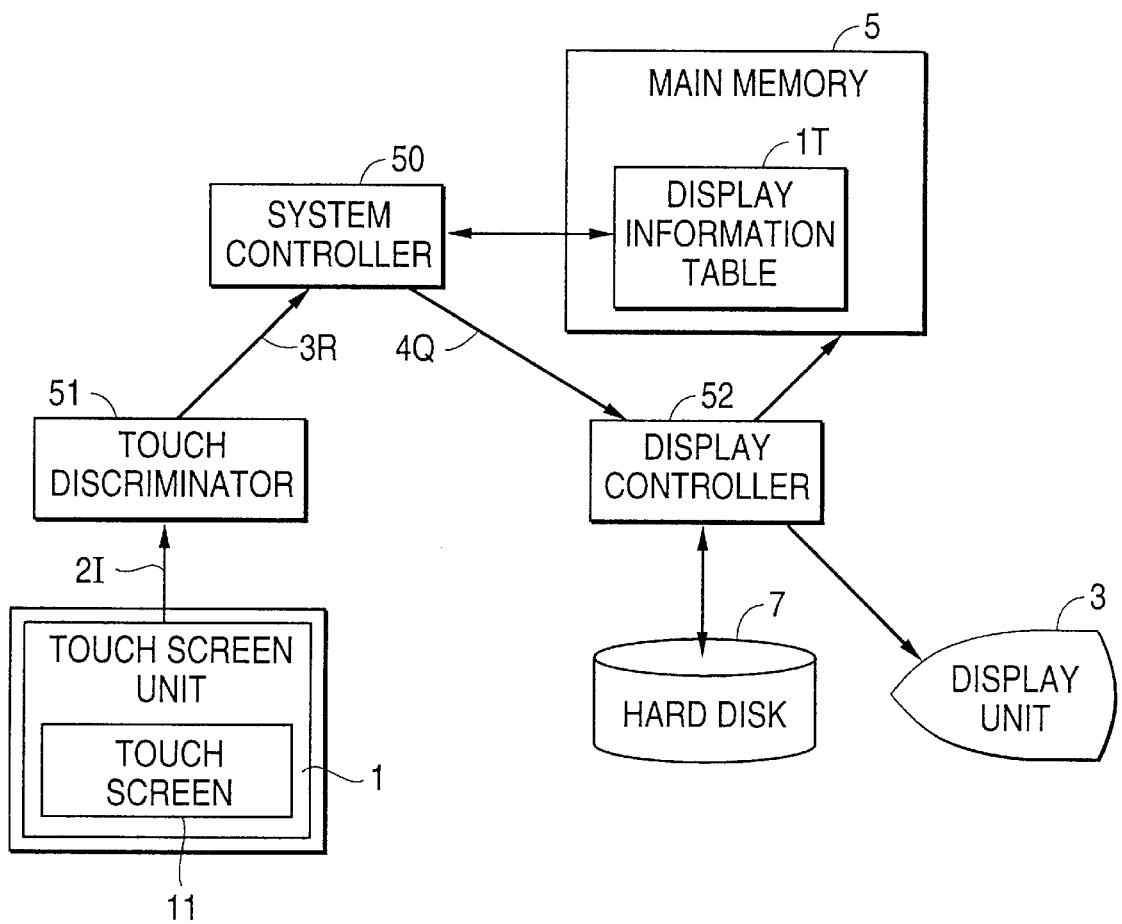
FIG. 3 is a schematic diagram illustrating the principle of the present invention.

FIG. 3 is a schematic diagram illustrating the principle of the present invention.

For easy understanding of the principle, the input-output port 8, touch screen controller 15 and touch screen unit 1 shown in FIG. 2 are represented in FIG. 3, in the composite, by the touch screen unit 1 and the frame memory 6 and display unit 3 and, as before-noted, the touch screen 11 actually is a transparent panel which is mounted on the display surface, or screen, of the display unit 3 but is shown separately therefrom in FIG. 3 of FIG. 2 are represented in FIG. 3, in the composite, by the display unit 3. The hard disk interface 71 and hard disk 7 of FIG. 2 are represented in FIG. 3, in the composite, by the hard disk 7. A system controller 50, a touch discriminator 51, a display controller 52, which are programs stored in the memory 5 and executed by the CPU 4 (or may be constructed by hardware), and a display information table 1T, stored in the main memory 5, control the display operations performed by the present invention.

FIG. 4(a) shows a display information table. FIG. 4(b) shows touch screen information.

The display information table 1T, which is provided in the main memory 5 and corresponds to objects, includes object type information, display position information, file information, normal-display file name and special-state file name. The object type defines the type, including the shape, properties, circumstances, etc., of the object. The display position information defines the size of the object (width "W" and height "H"), and the position (top-left coordinates X,Y) and the angle at which the object is displayed on the display unit 1. The file information, which is used for an object which is so large in size that it requires scrolling to view the whole object, defines the size (width W, height H) of the whole object relative to the display screen size, and also the position (top-left coordinates X,Y) of the object portion being displayed on the display device, relative to the whole object whose data is stored in the normal file. The normal-display file name specifies a display data file where object data for displaying a normal state of the object is stored. The special-state file name specifies a display data file where object data for displaying a special state (e.g., turn-over indication of display color, used for selectively displaying an intermediate process step, or stage, in manipulating the object) of the object is stored. The special state can be displayed selectively for each manipulation.

Touch-screen information 2I, which is sent from the touch screen unit 1, includes a touch position (X-Y coordinates) where the touch screen 11 is touched and the pressure applied thereon. The touch-screen information 2I may include two sets of X-Y coordinates shown in FIG. 4(b) depending on the type of touch, one set for a thumb and another for an index finger when the two fingers pick the object on its opposite sides, for example.

(1) The touch discriminator 51, based on the touch screen information 2I from the touch screen unit 1, discriminates the type of touch which the operator's finger has on the touch screen 11, that is, a touch type including, e.g., a "continuous touch start" and "continuous touch end" as explained later. The touch discriminator 51 sends, to the system controller 50, the result of the touch discrimination performed thereby as a touch report 3R, which includes touch type and, according to the touch-screen information 2I, one or two sets of touch coordinates.

Based on the touch report 3R from the touch discriminator 51 and the display information table 1T, the system controller 50 determines the type of manipulation which was conducted by the operator and, according to the determination, updates the display information table 1T. Then, the system controller 50 sends, to the display controller 52, a display update request 4Q including "display update data" which reflects the updated contents of the display information table 1T including display position information, filed information and normal display file name and special state file name.

On receipt of the display update request 4Q from the system controller 50, the display controller 52 reads a display data file (including object data), specified by the file name, from the hard disk 7 and stores the data into the main memory 5. The display controller 52 then updates the object data in accordance with the display update data from the system controller 50 and loads the thus-updated object data into the frame memory 6 (FIG. 2) thereby to display the object on the display unit 3 (FIG. 2), as manipulated by the operator on the touch screen unit 1.

Figures 7A, 7B:
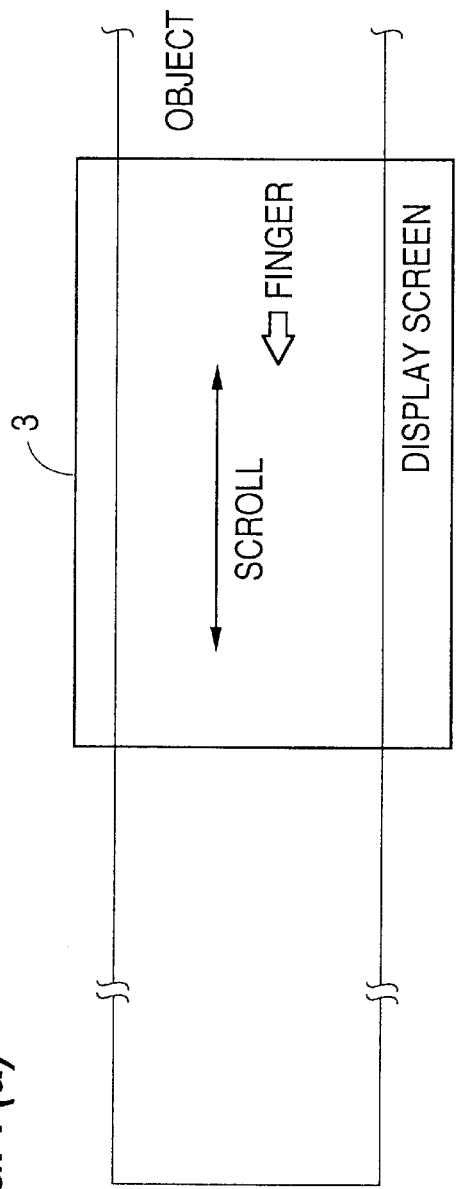
FIG. 7(a) is a diagram illustrating and FIG. 7(b) is a table explaining a scroll manipulation.

Thus, the system of the present invention determines a manipulation to be conducted on the displayed object, based on the touch screen information 2I which results from an operator's touching the touch screen 11 and the display information table 1T (see, FIG. 7(b)) which defines the object's shape, physical properties, display position, etc. The system then displays the object, according to the manipulation as thus determined and as intended by the operator, on the display unit 3.

(2) Pick manipulation (see FIGS. 5 and 6(a) to 6(c)).

A pick manipulation is conducted in such a way that an object is picked up at a position on the display surface of the display unit 3 and placed at another position thereon.

Figure 5:
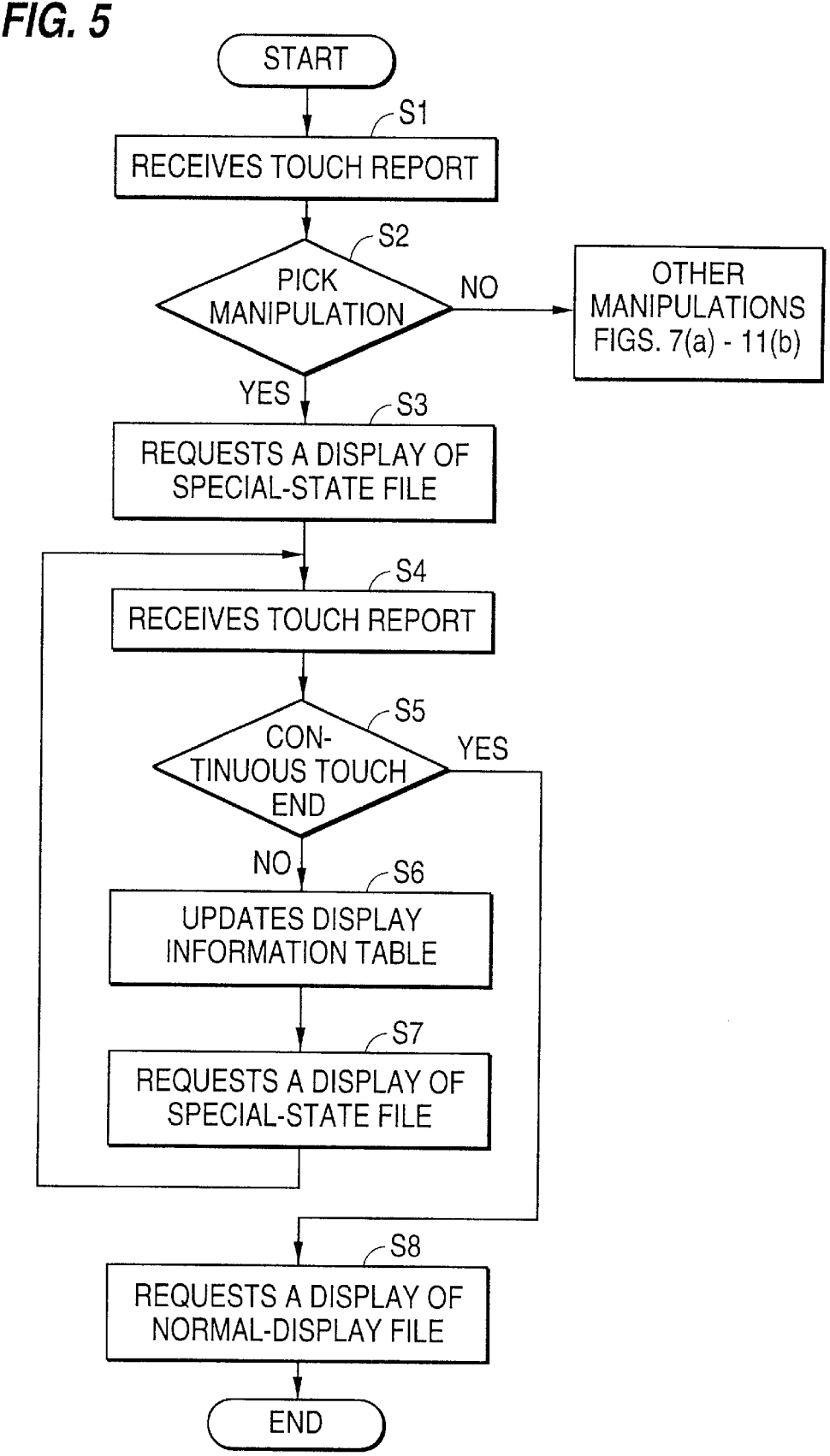
FIG. 5 is a flowchart illustrating a pick manipulation.

FIG. 5 is a flowchart illustrating a pick manipulation.

FIGS. 6(a) and 6(b) are related and interconnected diagrams illustrating, and FIG. 6(c) is a table explaining, a pick manipulation.

A pick manipulation is carried out according to the following steps (S1–S8) in FIG. 5:

(S1) The system controller 50 receives a touch report 3R including two sets of touch coordinates, from the touch discriminator 51.

(S2) The system controller 50 (FIG. 3) checks whether the object-finger relation is a pick manipulation, as shown in FIG. 6(a), based on the touch report 3R and contents of the display information table 1T shown in FIG. 6(c). When the relation is not a pick manipulation, the system controller 50 checks the touch report 3R for other possible manipulations.

(S3) When the relation is a pick manipulation, the system controller 50 sends a display update request 4Q including "display update data", commanding that the special-state file (turn-over indication) be displayed at the position specified by the display information table 1T.

(S4) The system controller 50 receives a touch report 3R.

(S5) The system controller 50 determines whether the touch report 3R includes a "continuous touch end", which occurs when the finger-object relation is as shown in FIG. 6(b). When a "continuous touch end" is reported, the operation goes to step (S8).

(S6) Otherwise, the system controller 50 updates the display position information "coordinates (X, Y)" of the display information table 1T so that the object is positioned between the two fingers of the operator.

(S7) The system controller 50 sends display update request 4Q to the display controller 52, commanding that the special-state file be displayed according to the display information table 1T, as updated, and returns to step (S4).

(S8) When "continuous touch end" is reported by a touch report 3R, the system controller 50 sends a display update request 4Q to the display controller 52, commanding that the normal-display file be displayed at the position specified in the display information table 1T.

The following manipulations are carried out in the same way as described in the above flowchart of the pick manipulation.

(3) Scroll manipulation (see FIGS. 7(a) and 7(b)).

A scroll manipulation is conducted in such a way that an object, extending outside of the display surface of the display unit 3, is moved into and out of the display surface.

FIG. 7(a) is a diagram illustrating, and FIG. 7(b) is a table explaining, a scroll manipulation.

On determining that the operator's finger moves while touching the touch screen 11, based on the touch screen information 2I from the touch screen unit 1, the discriminator 51 sends, to the system controller 50, a touch report 3R as previously discussed including, e.g., "continuous touch start" for the "touch type" and also, e.g., "coordinates (800, 800)" for the touch position. As another touch screen information 2I comes in, the discriminator 51 sends a touch report 3R including, e.g., "continuous touch in progress" and "coordinates (780, 800)" (i.e., the movement to the left by the finger as shown in FIG. 7(a), and thus from X=800 to X=780 while at a fixed Y=800). When the touch screen information 2I is not sent for more than 100 milliseconds, for example, the discriminator 51 sends a touch report 3R including "continuous touch end" and, e.g., "coordinates (700, 800)" (i.e., the final X,Y coordinate as of the "touch end") to the system controller 50.

When a "continuous touch start" is reported and the "object type" is defined as "out-screen" in the display information table 1T as shown in FIG. 7(b), the system controller 50 recognizes the manipulation as a scroll and the object as a large one extending beyond the display screen. Then, the system controller 50 determines the speed at which the finger has moved from right to left, for example, based on a change in the X-coordinate in terms of data, between a touch report 3R and the following one.

Depending on whether the finger has moved at a speed of more (high-speed) or less (normal-speed) than 20 dots, for example, the object display position on the display screen is scrolled initially at corresponding intervals of 100 or 500 milliseconds, respectively. Then, the interval, at which the display update request 4Q is sent to the display controller 52, is increased by a factor of 1.5 at each touch report 3R and, when the interval reaches 2 seconds, the scrolling is stopped.

Practically, the display position area of the screen is so controlled that it starts scrolling at the appropriate speed, as above-mentioned, after the operator's finger has moved a distance of 4 dots or more. That is, on recognizing that the finger has moved by that distance, the system controller 50 updates the file information "display position X" of the display information table 1T so that the object is displayed, shifted to the left by 10 dots, for example. The, it sends, to the display controller 52, a display update request including display position information, file information and normal display file name from the display information table 1T, as updated.

The display controller 52 reads from the hard disk 7 a display file specified by the normal display file name and loads it in the main memory 5. The display controller 52 then transfers only the part of the display file, as specified by the file information "display position X" of the display information table 1T, from the main memory 5 to the appropriate location of the frame memory 6.

In the same way, the system controller 50 sends a display update request 4Q to the display controller 52 every time it receives a touch report 3R.

When another "continuous touch" is reported before the scroll currently in progress comes to a stop, a new scroll can start from this point and at the first speed described above.

(4) Scroll-stop manipulation (see FIGS. 7(a) and 7(b)).

FIG. 7(a) is a diagram illustrating, and FIG. 7(b) is a table explaining, a scroll manipulation.

When a touch position given by a touch report 3R is the same as or up to approximately 5 dots apart from the position of the scrolling currently in progress, the system controller 50 doubles the frequency with which display update request 4Q are sent to the display controller 52, in order to put an end to the scrolling.

(5) Push manipulation (see FIGS. 8(a) to 8(c)).

A push manipulation is conducted in such a way that an object is pushed on the display surface of the display unit 3.

FIG. 8(a) is a diagram illustrating, and FIG. 8(c) is a table explaining, a push manipulation.

The system controller 50 determines the type of a manipulation, based on the touch report 3R and contents of the display information table 1T shown in FIG. 8(c). When the manipulation is a push manipulation as shown in FIG. 8(a), the system controller 50 sends, to the display controller 52, a display update request 4Q including display position information, file information and normal display file name so that the object is displayed close to the finger position reported by the touch report 3R. The above display operation is repeated until a "continuous touch end" is reported by a touch report 3R.

(6) Push-while-rotate manipulation (see FIGS. 8(b) and 8(c)).

A push-while-rotate manipulation is conducted in such a way that an object is pushed at a position off its center (or the center of gravity shown as X in FIG. 8(b)) and it moves rotating on the display surface of the display unit 3.

The system controller 50 determines the type of a manipulation, based on the touch report 3R and contents of the display information table 1T shown in FIG. 8(c). When the manipulation is a push-while-rotate manipulation as shown in FIG. 8(b), the system controller 50 sends, to the display controller 52, display update requests 4Q with the angle of rotation increasing by 2 degrees, i.e., while increasing the angle in the display information table 1T shown in FIG. 8(c).

The display controller 52 reads the display file from the hard disk and loads the data in the main memory 5, rotates the object by the specified angle and with the left-top coordinates (X, Y) as a rotational center, as specified by the display update request 4Q, and transfers the data, with the object rotated, from the main memory 5 to the frame memory 6.

(7) Flip manipulation (see FIGS. 9(a) to 9(c)).

A flip manipulation is conducted in such a way that an operator's finger flips an object or touches (i.e., impacts) the object from a remote position at a high speed on the touch screen 11 with a corresponding result on the display surface of the display unit 3.

FIG. 9(a) is a diagram illustrating, and FIG. 9(c) is a table explaining, a flip manipulation.

When a touch report 3R is input from the touch discriminator 51, the system controller 50 discriminates the type of the manipulation, based on the touch report 3R and the contents of the display information table 1T shown in FIG. 9(c). When the manipulation is a flip manipulation as shown in FIG. 9(a), the system controller 50 obtains the finger speed based on the touch report 3R and also obtains the object speed (i.e., the respective intervals at which display update requests 4Q are sent to the display controller 52), in the same way as described in item (3). The system controller 50 sends display update requests 4Q to the display controller 52, while updating the display position information left-top coordinates (X, Y) of the display information table 1T so that the object moves in the direction the finger moves. The system controller 50 stops moving the object when the above-mentioned interval reaches 2 seconds.

(8) Flip-under-gravity manipulation (see FIGS. 9(b) and 9(c)).

A flip-under-gravity manipulation is conducted in such a way that an object, which is subjected to gravity, is flipped by a finger on the touch screen 11 and with a corresponding result on the display surface of the display unit 3.

FIG. 9(a) is a diagram illustrating, and FIG. 9(c) is a table explaining, a flip manipulation.

When the finger manipulation is a flip as in the above item (8) and the display information table 1T defines the object type as "gravity" meaning that the object is subjected to gravity, for example, the object moves while receiving a combination of the forces of inertia and gravity, as shown in FIG. 9(b). Therefore, the system controller 50 sends display update requests 4Q to the display controller 52, while updating the display position information left-top coordinates (X, Y) by adding a value to the Y-coordinate of the display information table 1T. The value is represented by 2 to the Nth power (N: the number of display update requests 4Q which are sent). In this case, too, the system controller 50 stops moving the object when the above-mentioned interval reaches 2 seconds.

Figures 10A, 10B:
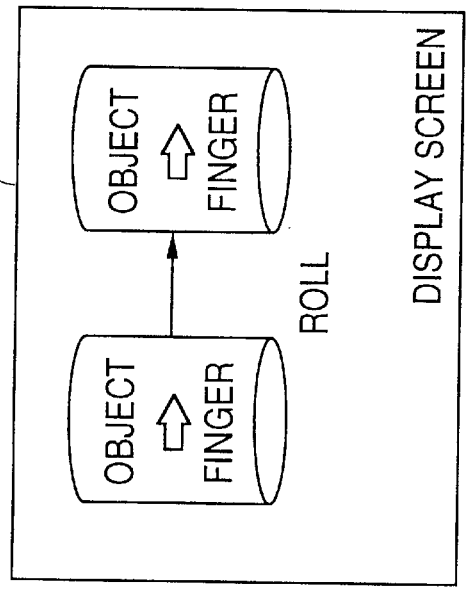
FIG. 10(a) is a diagram illustrating and FIG. 10(b) is a table explaining a roll manipulation.

(9) Roll manipulation (see FIGS. 10(a) and 10(b)).

A roll manipulation is conducted in such a way that a rollable object is rolled by the operator's finger on the touch screen 11 and with a corresponding result on the display surface of the display unit 3.

FIG. 10(a) is a diagram illustrating, and FIG. 10(b) is a table explaining, a roll manipulation.

When a touch report 3R is input from the touch discriminator 51 and the display information table 1T defines the object type as "rollable", meaning that the object is constructed such that it rolls when pushed by a finger, like a globe or a cylinder and as shown in FIG. 10(a), the system controller 50 sends display update requests 4Q to the display controller 52, while updating the display position information left-top coordinates (X, Y) of the display information table 1T so that the object moves a distance 10 percent behind the distance moves on the display screen and in the direction the finger moves. The system controller 50 sends display update request 4Q to the display controller 52 until "continuous touch end" is reported from the touch discriminator 51.

Figures 11A, 11B:
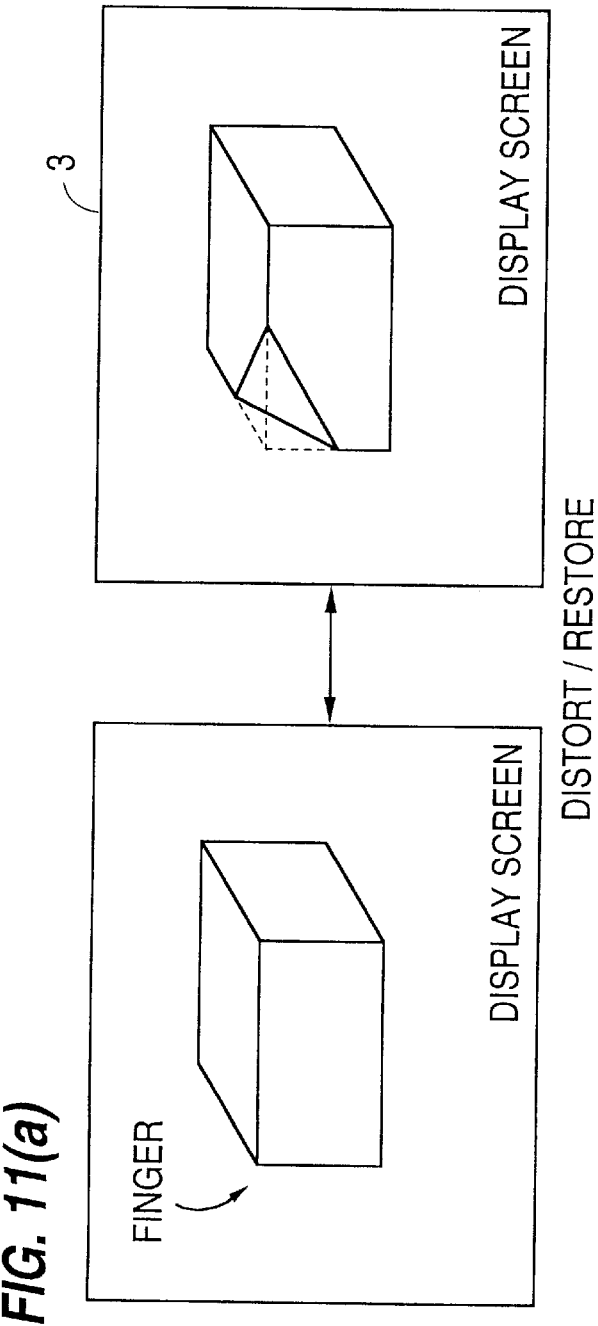
FIG. 11(a) is a diagram illustrating and FIG. 11(b) is a table explaining a distort-restore manipulation.

(10) Distort-restore manipulation (see FIGS. 11(a) and 11(b)).

A distort-restore manipulation is conducted in such a way that an elastic object is pressed by a finger on the display surface of the display unit 3.

FIG. 11(a) is a diagram illustrating, and FIG. 11(b) is a table explaining, a distort-restore manipulation.

When a touch report 3R is input from the touch discriminator 51 and the display information table 1T defines the object type as "elastic", meaning that the object can be distorted and restored according to a pressure applied thereon by a finger and as shown in FIG. 11(a), the system controller 50 calculates an amount of distortion of the object based on the pressure reported by the touch report 3R. It stores in the display information table 1T, a special-state file name specifying a corresponding one of the special-state files (for displaying a distorted state of the object in a turn-over indication) corresponding to the amount of distortion calculated. Then, the system controller 50 sends a display update request 4Q to the display controller 52, commanding that the special-state file be displayed at the current display position. The above operation is repeated as necessary and when a "continuous touch end" is reported by a touch report 3R, the system controller 50 sends a display update request 4Q (with a normal display file name specified) to the display controller 52, commanding that a normal display file (normal indication) be displayed at the current display position. A plurality of special-state files are provided in the hard disk 7, corresponding to the amount of distortion of the object which results from the pressure applied on the touch screen 11.

As is apparent from the above description, the present invention regards a display screen as a visual space. It defines conditions and physical properties of an object (e.g., weight, hardness, frictional resistance, center of gravity) in the display information table 1T. It also receives touch screen information 2I, indicating a finger-touched position and pressure, as input from a touch screen unit 1. Based on the touch screen information 2I and the display information table 1T, the present invention determines a manipulation to be conducted on the displayed object, e.g, scrolling, picking, pushing, rolling, distorting the object on the display surface of the display unit 3. Thus, the present invention allows a user to manipulate an object displayed on a display device quite easily, even when the user has little knowledge of computers.

What is claimed is:

1. An apparatus affording simulated manipulation of an object in accordance with an image of the object displayed on a display surface of a display device, comprising:

a touch panel, mounted in superimposed relationship on the display surface of the display device and made of a transparent material through which the object image, displayed on the display surface, is transmitted, the touch panel being sensitive to characteristics of a touching contact on the touch panel adjacent the displayed object image, the characteristics including at least coordinate positions of, and time-based changes in, the adjacent touching contact, and outputting corresponding touch panel information representing the characteristics of the adjacent touching contact on the touch panel;

a plurality of data files which respectively store object data defining the display of the object image on the display surface of the display device in each of a plurality of different states of the object;

display information storage means for storing a plurality of different types of object information, including at least:

object information specifying the shape and physical properties of the object, and display position information specifying the position on the display surface of the display device at which the object image currently is displayed; and display control means, responsive to the touch panel information output by the touch panel, for recognizing the simulated manipulation of the object image and, further, responsive to the object data and the object information for the displayed object image and the recognized, simulated manipulation of the object, for correspondingly manipulating and displaying the manipulated object image on the display surface of the display device.

2. An apparatus as recited in claim 1, wherein the display control means is responsive to, and recognizes as a pick manipulation, touch panel information representing touching contact on the touch panel at first and second positions respectively adjacent first and second, opposite sides of the object at an initial display position and further to touch panel information representing continuing, coordinated movement of the first and second touching contact positions from the initial and to a further position, displaced by a distance from the initial position, for correspondingly moving the object image display by a corresponding said distance, from the initial position and to a displaced display positions, on the display surface.

3. An apparatus as recited in claim 1, wherein;
the display control means is responsive to, and recognizes as a push manipulation, touch panel information indicating both touching contact on the touch panel at a central position of the displayed object and also continuing movement of the touching contact by a distance from an initial position to a displaced position, simulating movement of the displayed object and the stopping of such movement while maintaining touching contact with the displayed object and, in response to the recognized push manipulation, correspondingly moves the displayed object on the display surface by a corresponding distance to a displaced display position and then fixes the display of the displayed object at the displaced display position.

4. An apparatus as recited in claim 1, wherein the display control means is responsive to, and recognizes as a push-while-rotate manipulation, touch panel information representing both touching contact on the touch panel at a position displaced from the center of the displayed object and also movement of the touching contact by a distance from an initial position to a displaced position and the ending of the movement while maintaining touching contact with the object and, in response to the recognition of the push-while-rotate manipulation, correspondingly both moves and rotates the object image display from the initial display position and through a corresponding distance to a displaced display position and, then, fixes the display of the object image at the displaced display position.

5. An apparatus as recited in claim 1, wherein the display control means is responsive to, and recognizes as a flip manipulation, touch panel information representing movement of the touching contact on the touch panel from an initial position displaced from the object image display at a speed higher than a predetermined speed and into simulated impacting contact with the displayed object image and, in response to the recognized flip manipulation, correspondingly both moves the object image display by a distance, which is proportional to the speed of movement of the touching contact on the touch panel when simulating contact with the object display image at the initial display position, and in a direction, which corresponds to the direction of the touching contact movement at the simulated contact with the object image at the initial display position.

6. An apparatus as recited in claim 1, wherein the display control means is responsive to, and recognizes as a flip-under-gravity manipulation, touch panel information representing movement of the touching contact on the touch panel at a speed greater than a predetermined speed, from an initial position displaced from the initial display position of the object image and into simulated impacting contact with the displayed object image at an initial object image display position and, further, is responsive to object information of the displayed object image specifying the object type as being subject to the effects of gravity, for correspondingly moving the object image display from the initial object image display position by a distance proportional to the speed with which the touching contact simulates contact with the object image at the initial object image display position and along a parabolic path of movement corresponding to the travel of the object when impacted into movement and subjected to the effects of gravity.

7. An apparatus as recited in claim 1, wherein:
the touch panel is sensitive to the level of pressure of the touching contact thereon; and
the display control means is responsive to, and recognizes, as a distort-restore manipulation, touch panel information representing touching contact on the touch panel simulating a pressure-applying contact on the object and the pressure level of the pressure-applying touching contact and the release of the pressure-applying contact and, based on object information specifying the object type as being elastic, for correspondingly altering the configuration of the object image from that as initially displayed, in accordance with, respectively, distorting the displayed object image by an amount proportional to the pressure level of the simulated pressure-applying contact and the elasticity of the object and subsequently restoring the initial configuration of the object image released by the pressure of the touching contact.

8. An apparatus as recited in claim 1, wherein the display information storage means further comprises means for storing file information which specifies a position of the object image portion being displayed on the display device, relative to the whole object image whose data is stored in one of said plurality of data files.

9. An apparatus as recited in claim 8, the display surface having a fixed perimeter and corresponding display dimensions, wherein:
the display control means is responsive to, and recognizes as a scroll manipulation, touch panel information indicating touching contact on the touch panel and associated, simulated movement of the displayed object by the movement of the touching contact while maintaining the adjacent touching contact relationship with the displayed object image, and further is responsive to object information, specifying that the displayed object is an "out-screen" object type and therefore has dimensions exceeding the dimensions of the display surface of the display device, for controlling, and thereby producing, a scrolling display of the object image on the display surface of the display device.

10. An apparatus as recited in claim 9, wherein the display control means is responsive to, and recognizes as the end of the scroll manipulation, touch panel information from the touch panel indicating the discontinuation of the continuing, coordinated movement of the touching contact and correspondingly the discontinuation of the simulated, continuing movement of the displayed object image and, in response thereto fixes the object image display at the current display position thereof on the display surface of the display device.

11. A method for simulating manipulation of an object in accordance with a touching contact adjacent an image of the object displayed on a display surface of a display device employing a touch panel, mounted in superimposed relationship on the display surface of the display device and made of a transparent material through which the object image, displayed on the display surface, is transmitted, the method comprising:

sensing characteristics of a touching contact on the touch panel adjacent the displayed object image, the characteristics including at least coordinate positions of, and time-based changes in, the adjacent touching contact, and producing corresponding touch panel output information representing the characteristics of the adjacent touching contact on the touch panel;

storing object data defining the display of the object image on the display surface of the display device in each of a plurality of different states of the object in a plurality of data files;

storing display information comprising a plurality of different types of object information, including at least:
object information specifying the shape and physical properties of the object, and
display position information specifying the position on the display surface of the display device at which the object image currently is displayed; and responding to the touch panel information output by the touch panel for recognizing the simulated manipulation of the object and, further, to the object data and the object information for the displayed object image for correspondingly manipulating and displaying the manipulated object image on the display surface of the display device.

12. A method as recited in claim 11, further comprising:
responding to, and recognizing as a pick manipulation, touch panel information representing touching contact on the touch panel at first and second positions respectively adjacent first and second, opposite sides of the object at an initial display position and further to touch panel information representing continuing, coordinated movement of the first and second touching contact positions from the initial and to a further position, displaced by a distance from the initial position, for correspondingly moving the object image display by a corresponding said distance, from the initial position and to a displaced display position, on the display surface.

13. A method as recited in claim 11, further comprising:
responding to, and recognizing as a push manipulation, touch panel information indicating both touching contact on the touch panel at a central position of the displayed object and also continuing movement of the touching contact by a distance from an initial position to a displaced position, simulating movement of the displayed object and the stopping of such movement while maintaining touching contact with the displayed object and, in response to the recognized push manipulation, correspondingly moving the displayed object on the display surface by a corresponding distance to a displaced display position and then fixing the display of the displayed object at the displaced display position.

14. A method as recited in claim 11, further comprising:
responding to, and recognizing as a push-while-rotate manipulation, touch panel information representing both touching contact on the touch panel at a position displaced from the center of the displayed object and also movement of the touching contact by a distance from an initial position to a displaced position and the ending of the movement while maintaining touching contact with the object and, in response to the recognition of the push-while-rotate manipulation, correspondingly moving and rotating the object image display from the initial display position and through a corresponding distance to a displaced display position and then fixing the display of the object image at the displaced display position.

15. A method as recited in claim 11, further comprising:
responding to, and recognizing as a flip manipulation, touch panel information representing movement of the touching contact on the touch panel from an initial position displaced from the object image display at a speed higher than a predetermined speed and into simulated impacting contact with the displayed object image and, in response to the recognized flip manipulation, correspondingly both moving and rotating the object image display by a distance, which is proportional to the speed of movement of the touching contact on the touch panel when simulating contact with the object display image at the initial display position, and in a direction, which corresponds to the direction of the touching contact movement at the simulated contact with the object image at the initial display position.

16. A method as recited in claim 11, further comprising:
responding to, and recognizing as a flip-under-gravity manipulation, touch panel information representing movement of the touching contact on the touch panel at a speed greater than a predetermined speed, from an initial position displaced from the initial display position of the object image and into simulated impacting contact with the displayed object image at an initial object image display position and, further, responding to object information of the displayed object image specifying the object type as being subject to the effects of gravity, and correspondingly moving the object image display from the initial object image display position by a distance proportional to the speed with which the touching contact simulates contact with the object image at the initial object image display position and along a parabolic path of movement corresponding to the travel of the object when impacted into movement and subjected to the effects of gravity.

17. A method as recited in claim 11, further comprising:
responding to, and recognizing, as a distort-restore manipulation, touch panel information representing touching contact on the touch panel simulating a pressure-applying contact on the object and the pressure level of the pressure-applying touching contact and the release of the pressure-applying contact and, based on object information specifying the object type as being elastic, correspondingly altering the configuration of the object image from that as initially displayed, in accordance with, respectively, distorting the displayed object image by an amount proportional to the pressure level of the simulated pressure-applying contact and the elasticity of the object and subsequently restoring the initial configuration of the object image released by the pressure of the touching contact.

18. A method as recited in claim 11 wherein said responding further comprises:
providing, as said data files, a normal state display file which stores object data for displaying the normal state of the object, absent any simulated manipulation thereof, and plural sets of special state files respectively corresponding to the plural types of simulated manipulations of the object, each set storing initial and successive object data for displaying initial and successive special states of the object corresponding to successive conditions of the object resulting from the respective, simulated manipulation;

generating a touch report, in accordance with the touch panel information output by the touch panel in response to the touching contact on the touch panel adjacent a displayed object, the touch report identifying the object type of the displayed object and the recognized, simulated manipulation of the object;

in response to the touch report and the recognized, simulated manipulation provided thereby, accessing the stored display information including the special state file corresponding to both the object type and also the recognized, simulated manipulation of the object, and updating the stored display information with the initial object data of the special state file, displaying the object in accordance with the updated display information at the display position defined by the stored display position information;

generating a further touch report and determining whether the simulated manipulation has continued or has ended, and:

(a) if the simulated manipulation has ended, accessing the normal display file and updating the stored display information in accordance with the object data of the normal display file and displaying the object at the display position specified by, and in accordance with the thus updated object information, and (b) if the simulated manipulation has continued, accessing the special state file for obtaining therefrom the next successive object data corresponding to the next successive special state of the object, updating the stored display information with the thus obtained next successive object data, and displaying the object in accordance with the thus updated and stored display information and repeating the present step (b) for each successive, further touch report from which it is determined that the simulated manipulation has continued.

19. A method as recited in claim 18 wherein the simulated manipulation of the object is a pick manipulation.

20. A method as recited in claim 11, further comprising storing file information which specifies a position of the object image portion being displayed on the display device, relative to the whole object image of the stored object data.

21. A method as recited in claim 20, the display surface having a fixed perimeter and corresponding display dimensions, further comprising:

responding to, and recognizing as a scroll manipulation, touch panel information indicating touching contact on the touch panel and associated, simulated movement of the displayed object by the movement of the touching contact while maintaining the adjacent touching contact relationship with the displayed object image, and further is responsive to object information, specifying that the displayed object is an "out-screen" object type and therefore has dimensions exceeding the dimensions of the display surface of the display device, for controlling, and thereby producing, a scrolling display of the object image on the display surface of the display device.

22. A method as recited in claim 21, further comprising:

responding to, and recognizing as the end of the scroll manipulation, touch panel information from the touch panel indicating the discontinuation of the continuing, coordinated movement of the touching contact and correspondingly the discontinuation of the simulated, continuing movement of the displayed object image and, in response thereto, fixing the object image display at the current display position thereof on the display surface of the display device.

23. Apparatus for simulating manipulation of an object in accordance with touching contact adjacent an image of the object displayed on a display surface of a display devices comprising:

a memory storing, for each object image selectable for display on the display surface of the display device, object information specifying a type of the object and the shape and physical properties of the object;

a touch panel, mounted in superimposed relationship on the display surface of the display device and made of a transparent material through which an object image, selected and displayed on the display surface, is transmitted, coordinate positions being defined on the touch panel corresponding to coordinate positions of the display surface of the display device and the touch panel being sensitive and responsive to a touching contact thereon, adjacent a displayed object image, for outputting corresponding touch panel information, the touch panel output information comprising coordinate positions of, and time-based changes in, the adjacent touching contact; and display control means, responsive to the touch panel output information, for controlling the display of an object image, including changing the display of the object image in response to a change in the coordinate positions of the adjacent touching contact on the touch panel adjacent to the displayed object image and in accordance with the stored object information.

24. An apparatus as recited in claims 23, wherein the display control means further is responsive to touch panel output information indicating time-based changes in the coordinate positions of the touching contact for controlling the displayed object image to simulate corresponding movement thereof.

25. A method for manipulating an image of an object displayed on a display surface of a display device, comprising:

storing, for each object image selectable for display on the display surface of the display device object information specifying a type of the object;

defining a coordinate system on the display surface of the display device;

displaying an image object image on the display surface of the display device, including controlling the coordinate position of the displayed object image;

sensing touching contact in relation to the display surface of the display device adjacent to the displayed object image and outputting corresponding adjacent touching contact information including the effective coordinate positions of the adjacent touching contact and time-based changes therein; and controlling the display of the object image responsive to the touch panel output information, including changing the display of the object image, in response to a change in the coordinate positions of the touching contact on the touch panel adjacent to the displayed object image and in accordance with the stored object information.

26. A method as recited in claim 25, further comprising responding to touch panel output information indicating time-based changes in the coordinate positions of the touching contact for controlling the displayed object image to simulate corresponding movement thereof.

27. An apparatus affording simulated manipulation of an object in accordance with an image of the object displayed on a display surface of a display device, comprising:

a display device displaying an image of an object;

an input device responsive to a touching contact adjacent a position of the displayed object image as displayed by the display device, the adjacent touching contact simulating a manipulation of the object, and outputting corresponding touch information;

a characteristics detector receiving and detecting, from the received touch information, characteristics of the adjacent touching contact, the characteristics including the position of the adjacent touching contact and time-based changes of the position of the adjacent touching contact, and recognizing therefrom the corresponding object manipulation simulated thereby;

a storage unit storing object information specifying a type of the displayed object image; and a display controller changing the display of the object image in accordance with the stored object information for the displayed object image and the recognized, simulated object manipulation.

28. An apparatus according to claim 27, wherein:

in response to detected characteristics indicating that two touching contacts are located at opposite sides of the object image and move and stop with a distance therebetween, said display controller controls the display of the object image on the display device so that the object moves on a display surface of the display device from where the two touching contacts are located at opposite sides of the object image to where the two touching contacts stop with the distance therebetween.

29. An apparatus according to claim 27, wherein:

in response to the detected characteristics indicating that the touching contact position is located at the object and moves while keeping in contact with the object and the object is sufficiently large relative to, and extends beyond, the display or only a portion of the object image is displayed on the display device, the display controller displays the object by scrolling the object image on the display device.

30. An apparatus according to claim 29, wherein:

in response to the detected characteristics indicating that a moving, touching contact stops moving, the display controller displays the object image on the display device so that the scrolling of the object image stops on the display.

31. An apparatus as recited in claim 27, further comprising an information storage unit storing information specifying a position of a portion of the object image being displayed on the display device, relative to the whole object image.

32. An apparatus according to claim 27, wherein:

in response to the detected characteristics indicating that the moving, touching contact is located at a geometric center or at a center of gravity of the object and moves and stops while maintaining contact with the object, said display controller displays the object so that the object moves on a display surface thereof from where the touching contact is located at the geometric center or the center of gravity to where the moving, touching contact stops moving.

33. An apparatus according to claim 27, wherein:

in response to the detected characteristics indicating that touching contact is located at a position off the geometric center or off the center of gravity thereof and moves and stops while maintaining contact with the object, said display controller displays the object so that the object moves while rotating on the display, from where the touching contact is located at a position to where the touching contact stops.

34. An apparatus according to claim 27, wherein:

in response to the detected characteristics indicating that touching contact touches the object, coming in a direction from a position apart therefrom and at a speed higher than a predetermined speed, said display controller displays the object so that the object moves a distance in the direction and at a speed proportional to the speed with which the touching contact touches the object.

35. An apparatus according to claim 27, wherein:

said apparatus further comprises a display information storage unit storing object information specifying a type of the object as "rollable"; and in response to the detected characteristics indicating that the touching contact touches the object image, moving and stopping while maintaining contact with the object, the display controller displays the object image in a rolling condition.

36. An apparatus according to claim 27, wherein:

the input device is sensitive to an amount of pressure applied thereon and, when the detected characteristics indicate the touching contact touches the object with an amount of pressure, the display controller displays the object image so that the object image varies in a degree of distortion and/or restoration according to the amount of pressure of the touching contact.

37. An apparatus according to claim 27, wherein the input device is a panel, mounted with a display device, which is sensitive to the characteristics of touching contact on the panel.

38. An image display and manipulating apparatus, comprising:

a display device displaying an image of the object;

an input device inputting a touching contact adjacent a position of the object image as displayed by the display device;

a characteristics detector receiving and detecting, from the received touch information, characteristics of the adjacent touching contact, the characteristics including the position on the object image of the adjacent touching contact and time based changes of the position of the adjacent touching contact, and recognizing therefrom the corresponding object manipulation simulated thereby;

a display information storage unit storing object information including at least an object type, which specifies physical properties of the object; and a display controller changing the display of the object image in accordance with the stored object information specifying physical properties of the object and the recognized simulated object manipulation.

39. An apparatus manipulating a displayed image of an object, comprising:

a display device displaying an image of the object;

an input device inputting a touching contact adjacent a position of the object image displayed by the display device;

a characteristics detector receiving and detecting, from the received touch information, characteristics of the adjacent touching contact, the characteristics including a position of the adjacent touching contact on the object image and time based changes of the adjacent touching contact input by said input device;

a display information storage unit storing object information including at least an object type, which specifies physical properties of the object, and position information, which specifies a position at which the object image is displayed on the display device; and a display controller changing the display of the object image in accordance with the stored object information and the detected characteristics.

40. An apparatus simulating manipulation of an object in accordance with touching contact adjacent art image of the object displayed on a display surface of a display device, the apparatus comprising:

a touch panel mounted in relation to a display surface of a display device and sensitive to characteristics of a touching contact adjacent the object image, the characteristics including at least a position of, and time-based changes in, the adjacent touching contact, for outputting corresponding touch panel information representing a simulated movement of the object responsive to the adjacent touching contact;

a first display information storage means for storing object information including at least:
an object type which specifies physical properties of the object, and
position information which specifies the position where the object image is displayed on the display device; and a display controller recognizing a type of manipulation of the object image in accordance with the information representing a simulated movement of the object, output by the touch panel, and the object type stored in the display information storage unit and correspondingly manipulating and displaying the object image on the display device.

41. An apparatus as recited in claim 40, further comprising a second display information storage unit storing information specifying a position of a portion of the object being displayed on the display device, relative to the whole object.

42. A display apparatus simulating manipulation of an object, comprising:

a display device producing a display of an image of an object;

a display information storage unit storing object information, including at least an object type which specifies physical properties of the object;

a device responsive to touching contact thereon, adjacent to the displayed object image, simulating an actual touching contact with an actual object corresponding to the displayed object image;

a detecting unit detecting characteristics of the adjacent touching contact including a position of the adjacent touching contact relatively to the displayed object image and time-based changes of the position of the adjacent touching contact and recognizing therefrom the corresponding object manipulation simulated thereby; and a display controller changing the display of the image of the object in accordance with the stored object information specifying Physical properties of the object and the recognized simulated object manipulation.

* * * * *

UNITED STATES PATENT AND TRADEMARK OFFICE
CERTIFICATE OF CORRECTION

PATENT NO. : 5,844,547
DATED : December 1, 1998
INVENTOR(S) : Yu MINAKUCHI et al.

It is certified that error appears in the above-identified patent and that said Letters Patent is hereby corrected as shown below:

Col. 3,   line 46, change "file" to --display--;
          line 50, change "state" to --data--.

Col. 7,   line 5, after "speed" insert --,--.

Col. 12,  line 61, after "11" insert --,--.

Col. 13,  line 43, after "18" insert --,--.

Col. 17,  line 17, change "art" to --an--.

Col. 18,  line 33, change "Physical" to --physical--.

Signed and Sealed this

Fourteenth Day of September, 1999

Attest:

Q. TODD DICKINSON

*Attesting Officer*   *Acting Commissioner of Patents and Trademarks*